United States Patent [19]
Croft et al.

[11] Patent Number: 4,985,475
[45] Date of Patent: Jan. 15, 1991

[54] ENCAPSULANT COMPOSITIONS FOR USE IN SIGNAL TRANSMISSION DEVICES

[75] Inventors: Thomas S. Croft; Hartwick Haugen, both of Austin, Tex.

[73] Assignee: Minnesota Mining and Manufacturing, St. Paul, Minn.

[21] Appl. No.: 274,337

[22] Filed: Nov. 25, 1988

Related U.S. Application Data

[63] Continuation-in-part of Ser. No. 19,295, Mar. 9, 1987, Pat. No. 4,857,563.

[51] Int. Cl.[5] .............................................. H02G 15/00
[52] U.S. Cl. ...................................... 523/173; 524/77; 524/322; 525/64; 525/74; 525/285
[58] Field of Search .................. 523/173; 524/77, 322; 525/64, 74, 285

[56] References Cited

U.S. PATENT DOCUMENTS

| | | | |
|---|---|---|---|
| 3,527,720 | 9/1970 | Groff | 260/18 |
| 3,553,153 | 1/1971 | Hasem et al. | 260/29.6 |
| 3,897,514 | 7/1975 | Allabashi | 260/836 |
| 4,259,540 | 3/1981 | Sabia | 174/23 C |
| 4,497,663 | 2/1985 | Fisher et al. | 134/4 |
| 4,507,411 | 3/1985 | Gordon et al. | 523/436 |
| 4,532,299 | 7/1985 | Seneker | 525/122 |
| 4,703,101 | 10/1987 | Singer et al. | 528/87 |

FOREIGN PATENT DOCUMENTS

| | | | |
|---|---|---|---|
| 1224595 | 3/1979 | Canada . | |
| 1219951 | 1/1971 | United Kingdom | 525/64 |
| 2148900 | 7/1984 | United Kingdom . | |

*Primary Examiner*—Joseph L. Schofer
*Assistant Examiner*—Peter D. Mulcahy
*Attorney, Agent, or Firm*—D. M. Sell; J. V. Lilly

[57] ABSTRACT

The invention provides a grease compatible encapsulant composition capable of use with signal transmission devices, such as electrical or optical cable. The composition is the extended reaction product of an admixture of an anhydride functionalized compound, a crosslinking agent, and an oxirane containing material which provides improved hydrolytic stability to the encapsulant composition.

17 Claims, No Drawings

ENCAPSULANT COMPOSITIONS FOR USE IN SIGNAL TRANSMISSION DEVICES

CROSS REFERENCE TO RELATED APPLICATIONS

This application is a continuation-in-part of co-pending application Ser. No. 019,295 filed Mar. 9, 1987, U.S. Pat. No. 4,857,563.

TECHNICAL FIELD

This invention relates to compositions useful in encapsulating signal transmission devices.

BACKGROUND OF THE INVENTION

Signal transmission devices, such as electrical and optical cables, typically contain a plurality of individual conductors, each of which conduct an electrical or optical signal. A grease-like composition, such as FLEXGEL, (commercially available from AT&T) is typically used around the individual conductors. Other filling compositions include petroleum jelly (PJ) and polyethylene modified petroleum jelly (PEPJ). For a general discussion of cable filling compositions, and particularly FLEXGEL type compositions, see U.S. Pat. No. 4,259,540.

When cable is spliced it is often the practice to clean the grease-like composition from the individual conductors so that the encapsulant will adhere to the conductor upon curing, preventing water or other contaminants from seeping between the conductor and the encapsulant. Therefore, an encapsulant which will adhere directly to a conductor coated with a grease-like composition is highly desirable.

Many of the connecting devices (hereinafter connectors) used to splice individual conductors of a cable are made from polycarbonate. A significant portion of prior art encapsulants are not compatible with polycarbonate, and thus, stress or crack polycarbonate connectors over time. Therefore, it is desirable to provide an encapsulant which is compatible with, that is will not stress or crack, a polycarbonate connector.

It is often necessary that signal transmission devices, particularly splices, be re-entered for repairs, inspection or the like. Therefore, it is desirable to provide a re-enterable encapsulant. Further, it is desirable to provide a encapsulant which is transparent to facilitate inspection.

Many of the prior art encapsulants, which have addressed the above problems with varying degrees of success, are based on two-part polyurethane gels which include isocyanate and crosslinking portions. However, all of the two-part polyurethane gels share at least two common problems. First, the high water reactivity of isocyanates necessitates involved and expensive packaging to prevent reactions with water prior to cure with the crosslinking agent. Second, it is well known in the art that isocyanate compounds are hypo-allergenic, and thus, can induce allergic reactions in certain persons, particularly when a two part system which requires on-site mixing of the components is used.

Therefore, it is highly desirable to provide an encapsulant which serves as a water-impervious barrier, which has good adhesion to grease-coated conductors, which is compatible with polycarbonate splice connectors, which is re-enterable, which is transparent, and which does not require the use of an isocyanate compound.

Encapsulants used in signal transmission devices may be exposed for prolonged periods to high humidity and heat during use. This may cause the encapsulants to disintegrate, noticeably swell or revert to a liquid. It is generally known that polyesters can be degraded under such hydrolytic conditions. Therefore, it is further desirable to provide a polyester gel encapsulant composition which is hydrolytically stable.

The above-identified copending application describes an encapsulant composition which overcomes many of the disadvantages of the prior art. The composition of the copending application serves as a water-impervious barrier, is compatible with polycarbonate, splice connectors, may be transparent and re-enterable, and does not require the use of an isocyanate compound. The encapsulant comprises an extended reaction product of an admixture of (1) an effective amount of an anhydride functionalized compound (2) an effective amount of a crosslinking agent, and (3) at least one plasticizer to extend the reaction product.

It now has been discovered that the hydrolytic stability of the compositions disclosed in the copending application can be improved by the incorporation of an oxirane containing material.

The use of oxirane containing materials in various compositions is of course known. For example, Canadian Pat. No. 1,224,595 discloses a two-part, low viscosity, epoxy resin potting composition which cures to semi-flexible thermoset state comprised of liquid polyglycidyl ether, liquid carboxyl-terminated polyester, and cyclic dicarboxylic acid anhydride. This composition is not extended with a plasticizer and lacks grease and polycarbonate compatibility. Such a composition would be brittle, hard, and opaque, and would not be easily re-enterable.

Epoxy resins have also long been used as electrical potting compounds and for electric circuit boards. Typically, epoxy resins are tightly cross-linked when cured and form a brittle polymer with little flexibility and elongation, high tensile strength and a dielectric constant in the range of 3.8 to 5.5. Even flexibilized epoxy resins typically have tensile strengths well above 21.1 Newtons/$cm^2$ ($N/cm^2$) (normally in the 1000 range), a percent elongation of 10% to 20%, and dielectric constants at 25° C. and 1 MHz of greater than 3.0. Such epoxies fail to meet industry specifications for reenterable encapsulant materials. Generally, it has not been possible to formulate epoxies with enough softness or flexibility for use in encapsulating wire assemblies, for potting cable connectors or for other application where a soft, very flexible rubbery insulating material is needed.

In addition, epoxy resins typically have a temperature rise or exotherm of from 20° C. to as much as 260° C. with room temperature curing systems. Numerous detrimental effects can be experienced by high exotherms, including damaging effects on wire insulation, connecting devices and closure components.

Surprisingly, it has now been found that epoxy resins can be used in an encapsulant material to provide hydrolytic stability without adversely affecting the other outstanding properties, (e.g. adhesion to conductors, compatibility with polycarbonate, re-enterability, low dielectric constants) and without high exotherms.

SUMMARY OF THE INVENTION

The present invention provides a hydrolytically stable encapsulant composition particularly useful as an encapsulant for signal transmission devices, such as electrical or optical cables. It is to be understood that the invention has utility as an encapsulant for signal transmission devices which are not cables, for example, electrical or electronic components and devices, such as sprinkler systems, junction box fillings, to name a few. It is further contemplated that the encapsulant may have utility as an encapsulant or sealant for non-signal transmitting devices.

The encapsulant comprises an extended reaction product of an admixture of: (1) an effective amount of anhydride functionalized compound having reactive anhydride sites thereon; (2) an effective amount of crosslinking agent capable of reacting with said anhydride sites; and (3) an effective amount of an oxirane material sufficient to provide hydrolytic stability. The reaction product is extended with at least one organic plasticizer, present in the range of between 5 and 95 percent by weight of the encapsulant and preferably essentially inert to the reaction product and substantially non-exuding.

"Essentially inert" as used herein means that the plasticizer does not become cross-linked into the reaction between the anhydride functionalized composition and the cross-linking agent.

"Non-exuding" as used herein means that the plasticizer has the ability to become and remain blended with the reaction product of the anhydride functionalized compound, the cross-linking agent and oxirane material at ambient temperatures. Many excellent plasticizers experience some blooming, or a slight separation from the solid, especially at higher temperatures, and over lengthy storage times. These plasticizers are still considered to be "substantially non-exuding".

"Hydrolytic stability" as used herein is defined as a maximum percent weight change of from $-10\%$ to $+5\%$ as measured by test method 6.01 described in Bellcore Specification TA-TSY-000354 on Re-Enterable Encapsulants and a small change in hardness of less than 50, preferably less than 20, as measured with a quarter cone penetrometer.

"Anhydride functionalized compound" as used herein is defined as a polymer, oligomer, or monomer, which has been reacted to form a compound which has anhydride reactive sites thereon.

"Epoxy equivalent weight" as used herein is defined as the weight of resin which contains one gram equivalent of epoxy.

The invention also contemplates a method for filling an enclosure containing a signal transmission device comprising mixing an anhydride portion, a cross-linking portion, and an oxirane portion together to form a liquid encapsulant, pouring the liquid encapsulant composition into an enclosure at ambient temperature, the liquid encapsulant curing to form a cross-linked encapsulant which fills the enclosure including voids between the individual conductors of the transmission device. The liquid encapsulant composition of the invention may also be forced into a contaminated component under pressure to force the contaminant from the component, the encapsulant subsequently curing to protect the component from recontamination. The liquid encapsulant composition may also be poured into a component so that the encapsulant forms a plug or dam upon curing.

DETAILED DESCRIPTION

The encapsulant of the invention is suited for use as an encapsulant for signal transmission devices and other uses in which a hydrolytically stable, water-impervious, preferably re-enterable, barrier is desired. Encapsulant materials according to the invention are hydrolytically stable with a tensile strength of less than about 21.1 $N/cm^2$ and percent elongation of greater than about 50% but less than about 250% and dielectric constant at 1 MHz and 25° C. less than about 3.0. The temperature rise or exotherm is very low, on the order of less than 5° C. and, typically, less than 1° C. Further, they are compatible with cable filling compounds and with polycarbonate splice connectors.

The encapsulant may be used in a signal transmission device, for example, in a cable splice which comprises: (1) an enclosure member; (2) a signal transmission device which includes at least one signal conductor; and (3) at least one connecting device joining the at least one conductor to at least one other conductor in the enclosure member. The signal conductor is capable of transmitting a signal, for example, an electrical or optical signal.

The encapsulant is formed by reacting an anhydride functionalized compound with a suitable cross-linking agent and an oxirane containing material in the presence of an organic plasticizer which extends the reaction product. The oxirane containing material provides the encapsulant with hydrolytic stability. The plasticizer is preferably essentially inert to the reaction product and substantially non-exuding. The plasticizer system chosen contributes to the desired properties of the encapsulant, such as, the degree of adhesion to grease-coated conductors, the degree of compatibility with polycarbonate connectors, and the softness or hardness of the encapsulant.

Polymers, oligomers, or monomers which have been reacted to form a compound having reactive anhydride sites thereon are useful as the anhydride functionalized compound of the invention.

Examples of anhydride functionalized compounds which are suitable for use in the encapsulant of the invention include maleinized polybutadiene-styrene polymers (such as Ricon 184/MA), maleinized polybutadiene (such as Ricon 131/MA or Lithene LX 16-10MA), maleic anhydride modified vegetable oils (such as maleinized linseed oil, dehydrated castor oil, soybean oil or tung oil, and the like), maleinized hydrogenated polybutadiene, maleinized polyisoprene, maleinized ethylene/propylene/1,4-hexadiene terpolymers, maleinized polypropylene, maleinized piperylene/2-methyl-1-butene copolymers, maleinized polyterpene resins, maleinized cyclopentadiene, maleinized gum or tall oil resins, maleinized petroleum resins, copolymers of dienes and maleic anhydride or mixtures thereof.

The anhydride functionalized compound may be present in an amount ranging from about 1 to 90 percent by weight based on total solids of the reaction product.

Suitable cross-linking agents for use in the invention are compounds which will react with anhydride reactive sites of the anhydride functionalized compound to form a cross-linked polymer structure. Cross-linking agents suitable for the present invention include polythiols, polyamines and polyols.

Suitable polythiol and polyamine cross-linking agents may vary widely within the scope of the invention and include (1) mercaptans and (2) amines which are poly-functional. These compounds are often hydrocarbyl substituted but may contain other substituents either as pendant or catenary (in the backbone) units such as cyano, halo, ester, ether, keto, nitro, sulfide or silyl groups. Examples of compounds useful in the present invention included the polymercapto-functional compounds such as 1,4-butanedithiol, 1,3,5-pentanetrithiol, 1,12-dodecanedithiol; polythiol derivatives of polybutadienes and the mercapto-functional compounds such as the di- and tri-mercaptopropionate esters of the poly-(oxypropylene) diols and triols. Suitable organic diamines include the aromatic, aliphatic and cycloaliphatic diamines. Illustrative examples include: amine terminated polybutadiene, the polyoxyalkylene polyamines, such as those available for Texaco Chemical Co., Inc., under the tradename Jeffamine, the D, ED, DU, BuD and T series.

Suitable polyol cross-linking agents include, for example, polyalkadiene polyols (such as Poly bd R-45HT), polyether polyols based on ethylene oxide and/or propylene oxide and/or butylene oxide, ricinoleic acid derivatives (such as castor oil), polyester polyols, fatty polyols, ethoxylated fatty amides or amines or ethoxylated amines, hydroxyl bearing copolymers of dienes or mixtures thereof. Hydroxyl terminated polybutadiene such as Poly bd R-45HT is presently preferred.

The castor oil which may be used is primarily comprised of a mixture of about 70% glyceryl triricinoleate and about 30% glyceryl diricinoleate-monooleate or monolinoleate and is available from the York Castor Oil Company as York USP Castor Oil. Ricinoleate based polyols are also available from Caschem and Spencer-Kellogg. Suitable interesterification products may also be prepared from castor oil and substantially non-hydroxyl-containing naturally occurring triglyceride oils as disclosed in U.S. Pat. No. 4,603,188.

Suitable polyether polyol cross-linking agents include, for example, aliphatic alkylene glycol polymers having an alkylene unit composed of at least two carbon atoms. These aliphatic alkylene glycol polymers are exemplified by polyoxypropylene glycol and polytetramethylene ether glycol. Also, trifunctional compounds exemplified by the reaction product of trimethylol propane and propylene oxide may be employed. A typical polyether polyol is available from Union Carbide under the designation Niax PPG-425. Specifically, Niax PPG-425, a copolymer of a conventional polyol and a vinyl monomer, represented to have an average hydroxyl number of 263, an acid number of 0.5, and a viscosity of 80 centistokes at 25° C.

The general term polyether polyols also includes polymers which are often referred to as amine based polyols or polymeric polyols. Typical amine based polyols include sucrose-amine polyol such as Niax BDE-400 or FAF-529 or amine polyols such as Niax LA-475 or LA-700, all of which are available from Union Carbide.

Suitable polyalkadiene polyol cross-linking agents can be prepared from dienes which include unsubstituted, 2-substituted or 2,3-disubstituted 1,3-dienes of up to about 12 carbon atoms. Preferably, the diene has up to about 6 carbon atoms and the substituents in the 2-and/or 3-position may be hydrogen, alkyl groups having about 1 to about 4 carbon atoms, substituted aryl, unsubstituted aryl, halogen and the like. Typical of such dienes are 1,3-butadiene, isoprene, chloroprene, 2-cyano-1,3-butadiene, 2,3-dimethyl-1,2-butadiene, and the like. A hydroxyl terminated polybutadiene is available from ARCO Chemicals under the designation Poly-bd R-45HT. Poly-bd R-45HT is represented to have a molecular weight of about 2800, a degree of polymerization of about 50, a hydroxyl functionality of about 2.4 to 2.6 and a hydroxyl number of 46.6. Further, hydrogenated derivatives of the polyalkadiene polymers may also be useful.

Besides the above polyols, there can also be employed lower molecular weight, reactive, chain-extending or crosslinking compounds having molecular weights typically of about 300 or less, and containing therein about 2 to about 4 hydroxyl groups. Materials containing aromatic groups therein, such as N, N-bis (2-hydroxypropyl) aniline may be used to thereby produce useful gels.

To insure sufficient crosslinking of the cured gels the polyol based component preferably contain polyols having hydroxyl functionality of at least 2. Examples of such polyols include polyoxypropylene glycol, polyoxyethylene glycol, polyoxytetramethylene glycol, and small amounts of polycaprolactone glycol. An example of a suitable polyol is Quadrol,N,N,N',N'-tetrakis-(2-hydroxypropyl)-ethylene diamine, available from BASF Wyandotte Corp.

The cross-linking agent may be present in an amount ranging from about 0.5 to about 80 percent by weight based on total solids of the reaction product.

Oxirane containing materials that are useful in the encapsulant composition are epoxy compounds having aliphatic or cycloaliphatic backbones and at least one terminal or pendant oxirane group. Suitable oxirane containing materials would be aliphatic alkyl, alkenyl, alkadiene, cycloalkyl oxiranes. These may be substituted with any group, e.g., ester, alkoxy, ether and thioether, that does not react with the anhydride reactive sites of the anhydride functionalized compound. Monoepoxy, diepoxy and polyepoxy compounds and mixtures thereof may be used.

Examples of suitable oxirane materials are aliphatic glycidyl esters or ethers (such as Ciba-Geigy's Araldite RD-2, Wilmington's WC-68 or WC-97), triglycidyl ether or castor oil (such as Wilmington's WC-85), polypropylene oxide diglycidyl ethers (such as Grilonit's F 704), cycloaliphatic epoxides (such as Union Carbide's ERL4221 or Wilmington's MK-107), bicyclopentadiene ether epoxy resins, epoxidized polyunsaturated vegetable oil acid esters (such as Viking's Vikoflex 9080), epoxidized polyunsaturated triglycerides (such as Viking's Vikoflex 7190 and C. P. Hall's Paraplex G-62), epoxidized polyesters, epoxidized diene polymers (such as B F 1000 Resin from Nippon Soda), epoxidized polybutadiene polyols (such as Viking's polybutadiene oxides), epoxidized alpha olefins (such as Viking's Vikolox 16), terpene oxides (such as Viking's alpha pinene oxide), polybutene oxides (such as Viking's polybutene (L-14) oxide), Diel-Alder oxide (such as Viking's Dicyclopentadiene Diepoxide), or epoxidized natural rubber.

The oxirane containing material should be present in an amount sufficient to provide hydrolytic stability. The amount depends upon epoxy equivalent weight (EEW) which may vary over a wide range and is a function of the ratio of equivalents of anhydride functionalized compound (A) to oxirane (E), A/E ratio. The A/E ratio should be between about 0.25 to about 1.5, and preferably between about 0.25 to about 0.55. The higher the equivalent weight of the oxirane containing material (also referred to herein as epoxy equivalent weight) the greater the amount required to provide hydrolytic stability. Typically, the oxirane containing material is present in an amount ranging from about 1.5 to about 50 percent by weight based on the total solids of the reaction product.

The reaction product of an anhydride functionalized compound, a suitable cross-linking agent and an oxirane containing material is typically in the range of between about 5 and 95 weight percent and preferably between about 20 and 70 weight percent of the encapsulant. The admixture should contain between about 0.9 to about 1.1 reactive groups from the crosslinking agent for each anhydride reactive site.

The plasticizing system, which extends the reaction product of the anhydride functionalized compound, the cross-linking agent and oxirane containing material contributes to many of the functional characteristics of the encapsulant of the present invention. Plasticizing system refers to the one or more plasticizer compounds which may be used together to achieve the desired properties for the encapsulant. The plasticizing system is preferably selected so as to be essentially inert with the reaction product of the anhydride functionalized compound, the cross-linking agent and the oxirane containing material, and substantially non-exuding. The plasticizing system selected also preferably provides an encapsulant which has excellent adhesion to grease-coated conductors and which is compatible with polycarbonate connectors.

Plasticizer compounds which may be used to achieve a suitable plasticizing system include aliphatic, naphthenic, and aromatic petroleum based hydrocarbon oils; cyclic olefins (such as polycyclopentadiene,) vegetable oils (such as linseed oil, soybean oil, sunflower oil, and the like); saturated or unsaturated synthetic oils; polyalphaolefins (such as hydrogenated polymerized decene-1), hydrogenated terphenyls, propoxylated fatty alcohols (such as PPG-11 stearyl alcohol); polypropylene oxide mono- and di- esters, pine oil-derivatives (such as alpha-terpineol), polyterpenes, cyclopentadiene copolymers with fatty acid esters, phosphate esters and mono-, di-, and poly-esters, (such as trimellitates, phthalates, benzoates, fatty acid ester derivatives, castor oil derivatives, fatty acid ester alcohols, dimer acid esters, glutarates, adipates, sebacates and the like) and mixtures thereof. Particularly preferred are a mixture of hydrocarbon oils with esters.

Examples of polyalphaolefins which may be used as plasticizers in the present invention are disclosed in U.S. Pat. No. 4,355,130.

Examples of vegetable oils useful as plasticizers in the present invention are disclosed in U.S. Pat. No. 4,375,521.

The plasticizer compounds used to extend the reaction product may be present in the range of between 5 to 95 percent by weight of the encapsulant. More typically the plasticizer will be present in the range of between about 35 and 85 percent by weight of the encapsulant, and preferably between about 50 and 70 percent.

Previously it has been difficult to provide an encapsulant which has excellent adhesion to grease-coated wires and which also does not stress or crack a polycarbonate splice module. It has been discovered that by using a plasticizing system, in conjunction with a cross-linked anhydride functionalized compound, to provide an encapsulant having a particular total solubility parameter, both of these objectives can be achieved.

It has been discovered that the total solubility parameter of an encapsulant of the present invention can be an indication of an encapsulant's ability to adhere to grease-coated conductors and of its compatibility with polycarbonate connectors. The solubility parameter value (represented by δ) is a measure of the total forces holding the molecules of a solid or liquid together and is normally given without units although its units are properly $(Cal/per\ cc)^{\frac{1}{2}}$. Every compound or system is characterized by a specific value of solubility parameter and materials having similar solubility parameters tend to be miscible. See, for example, A. F. M. Barton "CRC Handbook of Solubility Parameters and Other Cohesion Parameters", 1983, CRC Press, Inc.

Solubility parameters may be obtained from literature values or may be estimated by summation of the effects contributed by all the groups in a molecular structure using available group molar attraction constants developed by Hoy, utilizing the following equation:

$$\delta = \frac{\Sigma F_T + 135.1}{V_M}$$

and using the group molar attraction constants in K. L. Hoy, "Tables of Solubility Parameters", Union Carbide Corp. 1975; J. Paint Technol 42, 76 (1970), where $\Sigma F_T$ is the sum of all the group molar attraction constants ($F_T$), $V_M$ is the molar volume (MW/d), MW is the molecular weight and d is the density of the material or system in question.

This method can be used to determine the solubility parameters of the cross-linked polymer and the individual value of each component if the chemical structure is known.

To determine the solubility parameter for hydrocarbon solvents, the following equation was utilized:

$$\delta = 6.9 + 0.02 \text{ Kauri-butanol value}$$

The Kauri-butanol value was calculated using the following equation:

$$KB = 21.5 + 0.206\ (\%\text{ wt. naphthenes}) + 0.723\ (\%\text{ wt. aromatics})$$

See, W. W. Reynolds and E. C. Larson, Off., Dig., Fed. Soc. Paint Technol. 34, 311 (1962); and Shell Chemicals, "Solvent Power", Tech. Bull ICS (x)/79/2, 1979.

The approximate compositions for the hydrocarbon oil can be obtained from the product brochures under the carbon type analysis for naphthenic and aromatic carbon atoms.

Cross-linked polymers may swell by absorbing solvent but do not dissolve completely. The swollen macromolecules are called gels.

For a plasticized crosslinked polymer system, the total solubility parameter would be the weighted arithmetic mean of the value of each component.

$$\delta_T = \delta_a\phi_a + \delta_b\phi_b + \delta_c\phi_c \ldots$$

Where $\phi_a$, $\delta_b$, and $\phi_c$ are the fractions of A, B, and C in the system and $\delta_a$, $\delta_b$, and $\delta_c$ are the solubility parameter of the individual components.

A plasticized crosslinked polymer system with a total solubility parameter of between about 7.9 and about 9.5 would be substantially compatible with the major constituents in the PJ, PEPJ, or FLEXGEL compositions. In order to achieve maximum compatibility with the grease compositions and also be compatible with polycarbonate, the total solubility of the encapsulant is preferably between about 7.9 and about 8.6, and more preferably, between about 8.0 and about 8.3.

The reaction between the anhydride functionalized compound, the cross-linking agent and the oxirane containing material may be catalyzed to achieve an increased curing rate. The type of catalyst useful for this reaction will depend upon the nature of the anhydride functionalized compound, the crosslinking agent and the oxirane containing material. Many tertiary amine catalysts have been found to be particularly useful ("tertiary amine", as used herein, is meant to include amidines and guanidines as well as simple tri-substituted amines). These tertiary amine catalysts include 1,8-diazabicyclo[5.4.0]undec-7-ene (DBU), 1,5-diazabicyclo[4.3.0]non-5-ene (DBN), and salts thereof, tetradecyldimethylamine, octyldimethylamine, octyldecylmethylamine, octadecyldimethylamine, 1,4-diazabicyclo[2.2.2]octane, tetramethylguanidine, 4-dimethylaminopyridine, and 1,8-bis(dimethylamino)-naphthalene, with DBU and DBN being especially preferred on the basis of the more rapid reaction rates provided.

Although the use of a catalyst is generally not necessary when the crosslinking agent is amine functional, addition of catalysts such as DBU and DBN may have an accelerating effect upon the reaction rate. When a catalyst is used, it should be present in an amount ranging from 0.1 to 5 percent by weight based on total solids of the reaction product to be effective, and preferably between 0.5 to 3.0 percent by weight.

Although the crosslinking reactions to prepare the encapsulant compositions of the present invention are preferably conducted at or near ambient temperature, it should be obvious to one skilled in the art that the reaction rate may be accelerated, if desired, by the application of elevated temperatures.

It is also possible to add other additives, such as fillers, fungicides, oxidation preventatives or any other additive as necessary. As oxidation preventatives, there can be used hindered phenols, for example, Irganox 1010, Tetrakis methylene (3,5-di-tert-butyl-4-hydroxyhydrocinnamate)methane, and Irganox 1076, Octadecyl B(3,5-tert-butyl-4-hydroxyphenol) propionate, (made by the Ciba-Geigy Company).

As stated above, the most common grease-like substance which is used to fill cables is FLEXGEL, an oil extended thermoplastic rubber, commercially available from AT&T. Other filling compositions include petroleum jelly (PJ) and polyethylene modified petroleum jelly (PEPJ). All such cable filling compositions are herein collectively referred to as grease.

To quantify the adhesion of an encapsulant to grease-coated conductors a test to determine an encapsulant's C-H Adhesion Value will be used. In general, this test measures the amount of force it takes to pull a grease-coated conductor from a vessel containing a cured encapsulant. The greater the force which is required, the greater the adhesion.

To determine the C-H Adhesion Value of an encapsulant the following test was conducted. Six, 0.046 cm diameter (22 gauge) polyethylene insulated conductors (PIC), taken from a length of FLEXGEL filled telephone cable purchased from General Cable Co. were cut into 15 cm lengths. The test vessels were filled almost flush with the top edge with the test encapsulant. A lid having several holes in it was placed thereon and a coated conductor was inserted into each hole such that 4 cm of the conductor protrude above the lid. A tape flag was placed at the 4 cm mark to support the conductors while the encapsulant cured. After four days at room temperature the lid was removed and the vessel mounted in a Instron tensile testing machine. Each conductor was pulled out of the encapsulant at a crosshead speed of about 0.8 mm/sec. The maximum pull-out force was measured in Newtons/conductor for each of the conductors. The average of the six values in Newtons/conductor was assigned as the C-H Adhesion Value. Similar tests were also run to determine the C-H Adhesion Value for conductors coated with a PEPJ grease and are included in the examples below. A C-H Adhesion Value of at least 4 is an acceptable value (4 Newtons/conductor maximum pull-out force), with a C-H Adhesion Value of at least 13 preferred.

As noted, a further concern in formulating an encapsulant for use in splice enclosures is the compatibility of the encapsulant with polycarbonate connectors. Compatibility is evidenced by a lack of stressing or cracking of a polycarbonate connector over time. An encapsulant's compatibility with polycarbonate will be quantified by assigning a Polycarbonate Compatibility Value (PCV). This will be measured by means of a stress test conducted on polycarbonate modules which have been encapsulated in a particular encapsulant at an elevated temperature for an extended period of time. The percentage of the original flexure test control value after four or nine weeks at 60° C. will be designated as the Polycarbonate Compatibility Value. The original flexure test control value is the breaking force in Newtons of three polycarbonate modules following flexure test ASTM D790 using an Instron tensile machine at a crosshead speed of about 0.2 mm/sec. An acceptable Polycarbonate Compatibility Value is 80 (80% of the average of the three control modules), with a value of 90 being preferred.

Polycarbonate Compatibility Values were determined as follows: Three control modules were crimped with the recommended maximum wire gauge, the wires had solid polyethylene insulation. This produced maximum stress on each module. The breaking force of the three modules was measured in Newtons, using the flexure test outlined in ASTM D790 on an Instron tensile machine, at a cross head speed of about 0.2 mm/sec. The average of these three values was used as the control value. Three crimped modules were placed in a tray and submerged in encapsulant. The tray was placed in an air pressure pot under 1.41 Kg/cm$^2$ pressure for 24 hours, while the encapsulant gelled and cured. After 24 hours, the tray with the encapsulated modules was placed in an air circulating oven at 60° C. for 4 weeks.

After 4 weeks, the samples were removed and allowed to cool to room temperature. The encapsulant was peeled from the modules. The breaking force of the three modules was measured following the ASTM D790 flexure test. The average of these three values, divided by that of the control, multiplied by 100, is assigned as the Polycarbonate Compatibility Value.

Hydrolytic stability was measured based on test method 6.01 described in Bellcore Specification TA-TSY-000354 on Re-Enterable Encapsulants and measures percent weight change. The hydrolytic stability of the cured gels were determined by measuring weight loss and hardness change on three 2.54 by 5.08 by 0.95 cm samples of each composition tested. The hardness of each sample was determined by a one-quarter cone penetrometer according to ASTM D-1403. All samples were then weighed and placed in boiling water (100° C.) with deionized water adjusted to pH 11.5 for 7 days. After turning off the heat the samples remained in the water for two hours, then were allowed to equilibrate to room temperature for two hours, weighed and their final hardness measured. The failure criteria for this test is a maximum percent weight change of from −10% to +5%. The encapsulant samples should retain sufficient hardness to maintain their original shape. The change in hardness can be measured with a quarter cone penetrometer. The smaller the change in hardness the greater the resistance to hydrolytic degradation.

The following lists of commercially available components were used in the examples which follow. Preparation A was prepared as described. The function of each component is also listed. Function is indicated as follows: Anhydride Functionalized Compound—"AFC"; Cross-linking Agent—"CA"; oxirane containing material—"O"; plasticizer compound—"P"; and catalyst—"C".

COMPONENT TABLE

| MATERIALS | DESCRIPTION | SOURCE | FUNCTION |
|---|---|---|---|
| Ricon 131/MA | Polybutadiene (80 ± 5% Trans and Cis 1,4 vinyl, 20 ± 5% 1,2 vinyl) - Maleic anhydride adduct with average molecular weight of about 6000 and equivalent weight of about 1745 | Colorade Chemical Specialities, Inc. | AFC |
| Lithene LX16-10MA | Polybutadiene (50–60% 1,4-Trans, 25–35%, 1,4 Cis, 10–15% 1,2 vinyl) - Maleic anhydride adduct with average molecular weight of about 8800 and equivalent weight of about 1100 | Revertex Ltd. | AFC |
| Nisso BN 1015 | Polybutadiene (>85% 1,2 vinyl) - maleic anhydride adduct with average molecular weight of about 1207 and equivalent weight of about 750 | Nippon Soda Co., Ltd. | AFC |
| Ricon 184/MA | Butadiene-styrene random copolymer - maleic anhydride adduct with average molecular weight of about 10,000 and equivalent weight of about 1730 | Colorado Chemicals Specialities, Inc. | AFC |
| PA-18 | Copolymer of octadecene-1 and maleic anhydride with average molecular weight of about 50,000 | Gulf Oil | AFC |
| Poly bd R-45 HT | Hydroxyl terminated polybutadiene (about 60% Trans-1,4, 20% Cis, 1,4 and 20% 1,2 vinyl) with average molecular weight of about 3000 and hydroxyl functionality of about 2.5 | Arco Chemical Co. | CA |
| Nisso G-3000 | Hydroxyl terminated polybutadiene (>90% 1,2 vinyl) with average molecular weight of about 3000 and hydroxyl functionality of >1.6 | Nippon Soda Co., Ltd. | CA |
| York USP Caster Oil | Vergetable oil of about 70% glyceryl triricinolein and about 30% glyceryl diricinolein mono-oleate or monolinoleate and hydroxyl functionality about 2.7 | York Caster Oil Co. | CA |
| Ethoduomeen T/13 | Ethoxylated fatty diamines with average molecular weight of about 470 and three primary hydroxyls | Armak | CA,C |
| Polycat DBU | 1,8 diaza-bicyclo (5,4,0) undecene-7 | Air Products | C |
| Flexon 650 | Naphthenic Oil, Aniline pt 190 | Exxon Co. | P |
| Sunthane 450 | Naphthenic Oil, Aniline pt 175 | Sun Oil Co. | P |
| ADMA 14 | Tetradecyldimethylamine | Ethyl Chemicals | C |
| DAMA 810 | Octyldecylmethylamine | Ethyl Chemicals | C |
| Paol 40 | Polyalphaolefin | Burmah-Castrol Inc. | P |
| Soybean Oil | Supreme Soybean Oil | Spencer Kellogg | P |
| Alpha-Terpincol | — | Hercules Inc. | P |
| Trixylenol Phosphate | — | FMC Inc. | P |
| Tricresyl Phosphate | — | FMC Inc. | P |
| Witconol APS | PPG-11 Stearyl Ether | Witco Chemical | P |
| Yarmor 302 | Pine Oil | Hercules Inc. | P |
| Emory 2900 | Dioctyl dimerate | Emery | P |
| Escopol R-020 | Polycyclopentadiene | Exxon Chemical | P |
| Sunthene 480 | Naphthenic Oil, anline pt 178 | Sun Oil Co. | P |
| Plasthall 100 | Isooctyl Tallate | C. P. Hall Co. | P |
| Flexricin P-8 | Glyceryl tri (acetyl ricinoleate) | CasChem, Inc. | P |
| Indopol H-100 | Polybutene | Amoco Chemical Corp. | P |
| Linseed Oil | Supreme Linseed Oil | Cargill | P |
| Nuoplaz 6959 | Tri-octyl Trimellitate | Nuodex, Inc. | P |
| 1,6-Hexanedithiol | — | Aldrich Chem. Co. | CA |
| Jeffamine T-403 | Polyether triamine with amine equivalent weight of about 150 | Texaco Chem. Inc. | CA |
| 1,9-Nonanedithiol | — | Aldrich Chem. Co. | CA |
| CasChem 126 | Polyurethane Encapsulant | CasChem, Inc. | |
| D-1000 | Polyurethane Encapsulant | AT&T | |
| Araldite RD-2 | 1,4-butanedioldiglycidyl ether, epoxy equivalent weight of about 136. | Ciba-Geigy | O |
| ERL-4421 | 3,4-epoxycyclohexyl-methyl-3,4-epoxy cyclohexane carboxylate, epoxy equivalent weight of about 137. | Union Carbide | O |
| ERL-4234 | 2-(3,4-epoxycyclohexyl-5,5-spiro-3,4-epoxy) cyclohexane-meta-dioxane, epoxy equivalent weight of about 143.5. | Union Carbide | O |
| Vikolox 12 | 1,2-epoxydodecane, about 7.8 percent oxirane oxygen. | Viking Chem. | O |
| Vikoflex 7190 | Exposidized linseed oil, about 9.0 percent oxirane oxygen. | Viking Chem. | O |
| Polybutadiene Oxide | Epoxidized Sartarmer Poly bd R-45 HT (hydroxylterminated polybutadiene), about 7.15 percent oxirane oxygen. | Viking Chem. | O |
| BF-1000 Resin | Epoxidized polybutadiene, about 7.4 percent oxirane oxygen. | Nisso Nippon Soda | O |
| Vikoflex 9080 | Octyl epoxy linseedate, about 7.0 percent oxirane oxygen. | Viking Chem. | O |
| Vikolox 16 | 1,2-hexadecane oxide, about 6.1 percent oxirane oxygen. | Viking Chem. | O |
| Vikolox 20–24 | Alpha olefin oxide, about 4.4 percent oxirane oxygen. | Viking Chem. | O |

-continued

| | COMPONENT TABLE | | |
|---|---|---|---|
| MATERIALS | DESCRIPTION | SOURCE | FUNCTION |
| Vikolox 24-28 | Alpha olefin oxide, about 3.7 percent oxirane oxygen. | Viking Chem. | O |
| Fuelsaver | Fungicide | Angus | |

The epoxy equivalent weights of the oxirane containing materials used in the examples of Tables II and III as determined by wet analysis are summarized here in Table I.

TABLE I

| | Oxirane Containing Materials | | |
|---|---|---|---|
| Material | Percent Oxirane Oxygen | Epoxy Equivalent Weight | Source-Structure |
| Araldite-RD-2 | — | 136 | Ciba-Geigy - 1,4-butanedioldiglycidyl ether |
| ERL-4221 | 11.7 | 137 | Union Carbide - 3,4-epoxy cyclohexyl-methyl - 3,4-epoxy cyclohexane carboxylate |
| ERL-4234 | — | 143.5 | Union Carbide - 2 (3,4-epoxycyclohexyl-5,5-spiro-3,4-epoxy) cyclohexane-meta-dioxane |
| Vikoflex 7190 | 9.0 | 117.8 | Viking - Epoxidized Linseed Oil |
| Vikolox 12 | 7.8 | 205 | Viking - 1,2-epoxy-dodecane |
| Polybutadiene Oxide | 7.15 | 215 | Viking - Epoxidized Sartamer Poly bd R-45HT (hydroxyl-terminated polybutadiene) |
| Vikoflex 9080 | 7.0 | 228.5 | Viking - ocytyl epoxy linseedate |
| Vikolox 16 | 6.1 | 262.3 | Viking - 1,2-hexadecane oxide |
| Vikolox 18 | 5.4 | 296.3 | Viking - 1,2-octadecane oxide |
| Vikolox 20-24 | 4.4 | 344.8 | Viking |
| Vikolox 24-28 | 3.7 | 438.4 | Viking |

The invention is further described in the following non-limiting examples wherein all parts are by weight. Where a particular test was not run in a particular example it is indicated by "--".

PREPARATION A—AMINE COMPOUND C

The following amine compound was prepared by charging to a reaction vessel 25 gram of Jeffamine T-403 (polyether triamine from Texaco Chemicals, Inc.), 0.309 equivalents and 170 gm isocty) acrylate, 0.923 equivalents. The vessel was mixed and heated slightly for 3 days to produce the Michael adduct. Spectral analysis confirmed that the addition had taken place.

EXAMPLE 1

An encapsulant of the present invention was prepared by mixing the following materials using an air-driven stirrer until the mixture appeared homogeneous.

22.2 parts of Ricon 131/MA, and 34.7 parts of soybean oil were added to a breaker and mixed using an air-driven stirrer until the mixture appeared homogeneous. To another beaker, 14.8 parts of Poly BD 45 HT, 1.26 parts of ADMA-14, 3.4 parts of Araldite RD-2, 0.2 parts Fuelsaver, 1.56 parts soybean oil and 21.88 parts Flexon 650 were added and likewise mixed. The beakers containing the mixtures were added to a third breaker and were mixed by hand for 2 minutes. Once mixed, the gel time was measured by determining the amount of time required for a 200 g sample to reach a viscosity of 1,000 poise using a Sunshine Gel Time Meter,' available from Sunshine Scientific Instrument. Clarity was measured visually. Clarity is either transparent (T) or opaque (O).

Tear strength was tested by the procedure of ASTM D-624, tensile strength and elongation were measured by the procedure of ASTM D-412; adhesion of the encapsulant to a grease coated wire was measured as described above (C-H adhesion value); and the encapsulants compatibility with polycarbonate (Polycarbonate Compatibility Value, PCV), was also measured as described above. The approximate Total Solubility Parameter for some of the encapsulants was also calculated as described above.

EXAMPLES 2-47, AND COMPARATIVE EXAMPLES

Encapsulants of the invention were prepared and tested as described in Example 1. The formulation test results are set forth in Tables II through V below.

TABLE II

| Example | 1 | 2 | 3 | 4 | 5 | 6 | 7 | 8 | 9 | 10 | 11 | 12 |
|---|---|---|---|---|---|---|---|---|---|---|---|---|
| Ricon 131 MA | 22.2 | 21.21 | 20.76 | 21.48 | 20.78 | 21.96 | 22.2 | 23.23 | 21.39 | 21.84 | 22.2 | 23.9 |
| Poly bd R45HT | 14.8 | 14.29 | 13.84 | 14.32 | 14.32 | 14.64 | 14.8 | 15.65 | 14.41 | 14.56 | 14.8 | 16.1 |
| ADMA-14 | 1.26 | 0.89 | 1.38 | 1.32 | 1.32 | 1.27 | 1.3 | 0.97 | 1.26 | 1.26 | 1.26 | 1.0 |
| Vikoflex 9080 | — | 11.09 | 6.4 | 5.91 | 5.74 | 4.8 | 4.0 | 2.43 | — | — | | |
| Vikoflex 7190 | | | | | | — | — | — | 4.36 | 4.2 | 3.0 | — |
| Vikolox 12 | | | | | | | | | | | — | 7.33 |
| Vikolox 16 | | | | | | | | | | | — | — |
| FuelSaver | 0.2 | 0.2 | 0.2 | 0.6 | 0.2 | 0.2 | 0.2 | 0.39 | 0.2 | 0.2 | 0.2 | — |
| Flexon 650 | 21.88 | 23.07 | 22.72 | 21.57 | 21.74 | 22.43 | 22.8 | 25.27 | 19.83 | 19.8 | 19.9 | 26.0 |
| Soybean Oil | 36.26 | 29.08 | 34.70 | 35.2 | 34.7 | 34.70 | 34.7 | 32.07 | 38.55 | 38.34 | 38.14 | 25.67 |
| Araldite RD-2 | 3.4 | — | — | — | — | | | | | | | |
| A/E Ratio | 0.51 | 0.25 | 0.43 | 0.48 | 0.5 | 0.6 | 0.73 | 1.25 | 0.51 | 0.56 | 0.75 | 0.38 |
| Tear Strength N/cm | 7.4 | 4.9 | 6.8 | 6.7 | 7.5 | 7.2 | 8.4 | 7.9 | 6.1 | 7.2 | 9.1 | 7.4 |
| Tensile Strength N/cm$^2$ | 13.6 | 10.3 | 14.1 | 11.5 | 13.2 | 13.1 | 14.3 | 15.4 | 13.1 | 13.8 | 15.1 | 16.9 |
| Elongation % | 90 | 134 | 129.5 | 121 | 119.5 | 123.5 | 109 | 127 | 137 | 134 | 142 | 123 |
| Geltime (minutes) | 57.9 | 187.1 | 64.9 | 69.1 | 64.8 | 63.8 | 63.8 | 86.1 | 82.5 | 73.0 | 67.3 | 71.2 |
| Gel-Clarity | T | T | T | T | T | T | T | T | T | T | T | T |
| Hydrolytic Stability (7 days 100° C., | | | | | | | | | | | | |

TABLE II-continued

| | | | | | | | | | | | | |
|---|---|---|---|---|---|---|---|---|---|---|---|---|
| water pH 11.5) | | | | | | | | | | | | |
| Hardness (quarter cone) | 25.0 | 15.7 | 28.8 | 29.0 | 31.7 | 34.0 | 44.6 | 64.0 | 25.5 | 35.2 | 43.0 | 16.5 |
| Change in quarter cone | 15.0 | 3.9 | 14.6 | 14.1 | 18.7 | 20.7 | 29 | 53.1 | 11.2 | 20.7 | 28.2 | 3.3 |
| % Weight Change | +2.3 | −0.81 | −0.3 | +1.4 | −1.79 | +1.66 | +1.5 | +2.64 | +1.9 | — | — | +0.03 |
| C-H Adhesion Value, N | 16.9 | — | 21.4 | — | 22.7 | 22.2 | 23.1 | — | 20.9 | 29.4 | 21.4 | 24.0 |
| Flexgel Polycarbonate Compatibility 60° C. (breaking force, N) | | | | | | | | | | | | |
| 1 week | — | — | — | — | 553 | 544 | — | — | — | — | — | — |
| 3 weeks | 522 | — | — | 537 | 527 | 524 | — | — | — | — | — | — |
| 4 weeks | 521 | — | — | 507 | 513 | 514 | — | — | — | — | — | — |
| PCV Value (note: control 538) | 97 | — | — | 94 | 95 | 95 | — | — | — | — | — | — |
| Total Solubility Parameter (TSP) | 8.2 | — | — | 8.2 | 8.1 | 8.2 | — | — | — | — | — | — |

| Example | 13 | 14 | 15 | 16 | 17 | 18 | 19 | 20 | 21 | 22 | 23 | 24 |
|---|---|---|---|---|---|---|---|---|---|---|---|---|
| Ricon 131MA | 23.9 | 36.0 | 22.2 | 23.9 | 23.9 | 23.43 | 22.2 | 21.6 | 23.9 | 23.9 | 23.9 | 21.48 |
| Poly bd R45HT | 16.1 | 24.0 | 14.8 | 11.1 | 13.1 | 15.78 | 14.8 | 14.4 | 16.1 | 16.1 | 16.1 | 14.32 |
| ADMA-14 | 1.0 | 0.9 | 1.3 | 1.0 | 1.0 | 0.98 | 1.26 | — | 1.0 | 1.0 | 1.0 | — |
| Vikoflex 9080 | | | | | | | | | — | — | — | 5.91 |
| Vikoflex 7190 | — | — | — | | | | | | | | | |
| Vikolox 12 | 3.13 | — | — | | | | | | | | | |
| Vikolox 16 | — | 14.1 | 6.8 | | | | | | 9.4 | — | — | — |
| Vikolox 20–24 | | | | | | | | | — | 12.7 | — | — |
| Vikolox 24–28 | | | | | | | | | — | — | 16.1 | — |
| Polybutadiene Oxide | | | | 5.0 | 3.0 | — | — | — | | | | |
| ERL 4234 | | | | — | — | 1.96 | — | — | | | | |
| ERL 4221 | | | | — | — | — | 3.4 | — | | | | |
| BF-1000 | | | | — | — | — | — | 5.94 | | | | |
| FuelSaver | — | 0.2 | 0.2 | 0.4 | 0.3 | — | 0.2 | 0.2 | | | | |
| Flexon 650 | 26.0 | 21.9 | 20.0 | 25.6 | 25.7 | 25.5 | 21.88 | 19.66 | 16.6 | 13.3 | 9.9 | 19.67 |
| Soybean Oil | 29.87 | 6.8 | 34.7 | 33.0 | 33.0 | 32.35 | 36.26 | 35.3 | 33.0 | 33.0 | 33.0 | 35.42 |
| DAMA-810 | | | | — | — | — | — | 2.9 | — | — | — | 3.0 |
| A/E Ratio | 0.9 | 0.38 | 0.49 | 0.61 | 1.0 | 1.0 | 0.51 | 0.45 | 0.38 | 0.37 | 0.37 | 0.48 |
| Tear Strength N/cm | 7.7 | 12.3 | 8.9 | 8.6 | 8.9 | 6.7 | 8.6 | 6.8 | 10.8 | 8.8 | 12.2 | 5.1 |
| Tensile Strength $N/cm^2$ | 17.4 | 25.8 | 14.3 | 16.1 | 14.2 | 17.1 | 14.1 | 13.1 | 14.5 | 19.5 | 20.0 | 11.5 |
| Elongation % | 122 | 88 | 125 | 142 | 95 | 125 | 109 | 126 | 116 | 139 | 96 | 100 |
| Geltime (minutes) | 61.4 | 73.7 | 66.2 | 87.4 | — | 67.2 | 61.7 | 61.5 | 60 | 35.3 | 40.8 | 62 |
| Gel-Clarity | T | T | T | T | T | T | T | T | T | T | T | T |
| Hydrolytic Stability (7 days, 100° C., water pH 11.5) | | | | | | | | | | | | |
| Hardness (quarter cone) | 46.5 | 10.5 | 55.6 | 18 | 31.7 | 30.5 | 22.5 | — | 21.2 | 23.3 | 9.8 | 26.3 |
| Change in quarter cone | 33.8 | 3 | 38.6 | 8 | 19.9 | 21.5 | 11.0 | — | 8.9 | 10.6 | 0.6 | 13.1 |
| % Weight Change | +0.3 | +0.3 | +3.99 | +1.2 | +5.0 | −4.6 | −0.76 | — | +0.2 | −0.3 | +2.3 | +0.8 |
| C-H Adhesion Value, N | — | — | 26.2 | — | — | — | — | — | — | — | 26.2 | |
| Flexgel Polycarbonate Compatibility 60° C. (breaking force, N) | | | | | | | | | | | | |
| 1 week | — | — | — | — | — | — | — | — | — | — | — | — |
| 3 weeks | — | — | — | — | — | — | 548 | — | — | — | — | 528 |
| 4 weeks | — | — | — | — | — | — | 521 | — | — | — | — | 530 |
| PCV Value | — | — | — | — | — | — | 97 | — | — | — | — | 98 |
| Total Solubility Parameter (TSP) | — | — | — | — | — | — | 8.2 | — | — | — | — | 8.2 |

| Example | 25 | 26 | 27 | 28 | 29 | 30 | 31 | 32 | 33 | 34 | 35 | 36 |
|---|---|---|---|---|---|---|---|---|---|---|---|---|
| Lithene LX16-10MA | | | | | | | | | | | 17.84 | — |
| Ricon 131MA | 59.45 | 27.8 | 17.06 | 30.49 | 34.52 | 21.6 | 21.6 | 21.6 | 21.69 | 11.32 | — | 44.26 |
| Nisso BN 1015 | | | | | | | | | | | — | — |
| PA-18 | | | | | | | | | | | — | — |
| Nuoplaz 6959 | | | | | | 55.16 | — | — | — | — | | |
| Flexricin P-8 | | | | | | — | — | 55.16 | — | — | | |
| Emory 2900 | | | | | | — | 55.16 | — | — | — | | |
| Castor Oil | 10.55 | — | — | — | — | | | | | | | |
| Ethoduomeen T-13 | — | 1.0 | — | — | — | | | | | | | |
| Nisso GI 3000 | — | — | 18.94 | — | — | | | | | | | |
| Amine Compound C | — | — | — | 5.5 | — | | | | | | | |
| 1,6-hexandithiol | — | — | — | — | 1.49 | | | | | | | |
| DAMA-810 | 2.5 | — | 3.0 | — | — | 2.9 | 2.9 | 2.9 | 2.9 | 4.0 | | |
| ADMA-14 | — | — | — | 1.5 | 1.5 | | | | | | 1.5 | 1.0 |
| DBU | | | | | | | | | | | — | — |
| Flexon 650 | — | 23.3 | 15.22 | 20.0 | 19.0 | — | — | — | — | 28.23 | 22.0 | 8.82 |
| Soybean Oil | 11.2 | 29.1 | 39.84 | 33.73 | 34.0 | — | — | — | 54.96 | 45.57 | 35.05 | 8.83 |
| Vikoflex 9080 | 16.3 | 7.6 | 5.94 | 8.78 | 9.49 | 5.94 | 5.94 | 5.94 | 5.94 | 3.12 | 5.45 | 11.35 |
| Fuelsaver | | | | | | — | — | — | 0.2 | 0.2 | | |
| Poly bd R45HT | — | 11.2 | — | — | — | 14.4 | 14.4 | 14.4 | 14.4 | 7.55 | 18.16 | 25.74 |
| A/E Ratio | 0.49 | 0.48 | 0.38 | 0.45 | 0.48 | 0.48 | 0.48 | 0.48 | 0.48 | 0.68 | 0.52 | |
| Tear Strength N/cm | 6.5 | 2.2 | 4.7 | 5.3 | 3.2 | 6.5 | 5.6 | 9.1 | 6.5 | 1.9 | 7.2 | 10.7 |
| Tensile Strength $N/cm^2$ | 14.4 | 6.7 | 10.4 | 12.2 | 7.9 | 15.9 | 14.3 | 14.5 | 11.7 | 3.4 | 17.0 | 17.0 |

TABLE II-continued

| | | | | | | | | | | | | |
|---|---|---|---|---|---|---|---|---|---|---|---|---|
| Elongation % | 130 | 101 | 116 | 103 | 104 | 108 | 107 | 131 | 105 | 208 | 92 | 286 |
| Geltime (minutes) | — | 10.5 | 341.4 | 373.1 | 30.2 | 81.8 | 135.1 | 81.8 | — | 203.6 | 28.9 | 143.3 |
| Gel-Clarity | T | T | T | T | T | T | T | T | T | T | T | T |
| Hydrolytic Stability (7 days, 100° C., water pH 11.5) | | | | | | | | | | | | |
| Hardness (quarter cone) | 8.9 | — | 24.7 | 17.0 | — | 25.2 | 22.5 | 32.2 | 30.0 | — | 17 | 11.7 |
| Change in quarter cone | 0.0 | — | 8.7 | 0.2 | — | 15.0 | 9.3 | 21.2 | 15.5 | — | 4.8 | 0.0 |
| % Weight Change | +3.7 | — | — | +4.8 | — | +5.5 | — | — | — | | — | +4.1 |
| C-H Adhesion Value, N | — | — | 23.6 | 12.9 | 14.2 | 34.7 | 23.1 | — | — | — | 20.5 | 40.9 |
| Flexgel Polycarbonate Compatibility 60° C. (breaking force, N) | | | | | | | | | | | | |
| 1 week | — | — | — | — | — | — | — | — | — | — | — | — |
| 3 weeks | — | — | — | — | — | — | — | — | — | — | — | — |
| 4 weeks | — | — | — | — | — | — | — | — | — | — | — | — |
| PCV Value | — | — | — | — | — | — | — | — | — | — | — | — |
| Total Solubility Parameter (TSP) | — | — | — | — | — | — | 8.1 | — | 8.3 | — | — | — |

| Example | 37 | 38 | 39 | 40 | 41 | 42 | 43 | 44 | 45 | 46 | 47 |
|---|---|---|---|---|---|---|---|---|---|---|---|
| Lithene LX16-10MA | — | — | — | | | | | | | | |
| Ricon 131MA | | | | 21.6 | 21.6 | 21.6 | 21.6 | 21.6 | 34.12 | 21.6 | 21.6 |
| Ricon 184MA | 28.43 | — | — | | | | | | | | |
| Nisso BN 1015 | — | — | 14.8 | | | | | | | | |
| PA-18 | — | 4.92 | — | | | | | | | | |
| Poly bd R45HT | 13.24 | 16.34 | 22.1 | 14.4 | 14.4 | 14.4 | 14.4 | 14.4 | — | 14.4 | 14.4 |
| DAMA-810 | | | | 5.94 | 5.94 | 5.94 | 5.94 | 5.94 | — | 2.9 | 2.9 |
| ADMA-14 | 1.3 | — | — | | | | | | | | |
| DBU | — | 0.38 | 0.34 | | | | | | 0.34 | — | — |
| 1,9-nonanedithiol | | | | | | | | | 1.88 | — | — |
| Flexon 650 | 28.43 | 67.69 | 20.66 | | | | | | 19.0 | — | — |
| Soybean Oil | 28.43 | — | 32.6 | | | | | | 32.16 | — | — |
| Vikoflex 9080 | 5.84 | 10.68 | 9.5 | 5.94 | 5.94 | 5.94 | 5.94 | 5.94 | 12.5 | 5.94 | 5.94 |
| Linseed Oil | | | | | | | | | — | 35.3 | 35.3 |
| Paol 40 | | | | | | | | | — | 19.86 | — |
| Indopol H-100 | | | | | | | | | — | — | 19.86 |
| Suthene 450 | | | | 35.3 | 35.3 | 35.3 | 35.3 | 35.3 | | | |
| Alpha-Terpiniol | | | | 19.86 | — | — | — | — | | | |
| Yarmor 302 | | | | — | 19.86 | — | — | — | | | |
| Witconol APM | | | | — | — | — | 19.86 | — | | | |
| Excopol R020 | | | | — | — | — | 19.86 | — | | | |
| Trixylenyl Phosphate | | | | — | — | — | — | 19.86 | | | |
| A/E Ratio | 0.64 | — | 0.48 | 0.48 | 0.48 | 0.48 | 0.48 | 0.48 | 0.36 | 0.48 | 0.48 |
| Tear Strength N/cm | 4.0 | 2.3 | 1.8 | 2.5 | 3.5 | 4.2 | 6.3 | 5.1 | 1.2 | 5.6 | 6.3 |
| Tensile Strength N/cm$^2$ | 6.0 | 3.4 | 4.0 | 4.1 | 9.2 | 6.4 | 16.8 | 11.9 | 4.9 | 10.5 | 12.9 |
| Elongation % | 279 | 195 | 195 | 271 | 125 | 197 | 107 | 90 | 60 | 122 | 143 |
| Geltime (minutes) | 285 | — | — | 116.8 | 71.8 | 89.4 | 38.1 | 89.9 | — | 89.3 | 67.6 |
| Gel-Clarity | T | T | T | T | T | T | T | T | T | T | T |
| Hydrolytic Stability (7 days, 100° C., water pH 11.5) | | | | | | | | | | | |
| Hardness (quarter cone) | 37.8 | | | 46.7 | 29.7 | 39 | | | | | |
| Change in quarter cone | 0.0 | | | 5.2 | 15.4 | 13.7 | | | | | |
| % Weight Change | — | | | +0.6 | −1.3 | +3.7 | | | | | |
| C-H Adhesion Value, N | 11.1 | — | — | 13.8 | 27.6 | 18.7 | 24.5 | 28.9 | — | 20.0 | — |
| Flexgel Polycarbonate Compatibility 60° C. (breaking force, N) | | | | | | | | | | | |
| 1 week | — | — | — | — | — | — | — | — | — | — | — |
| 3 weeks | — | — | — | — | — | — | — | — | — | — | — |
| 4 weeks | — | — | — | — | — | — | — | — | — | — | — |
| PCV Value | — | — | — | — | — | — | — | — | — | — | — |
| Total Solubility Parameter (TSP) | — | — | — | — | — | — | — | — | — | — | — |

TABLE III

| | COMPARATIVE EXAMPLES | | | | | | | |
|---|---|---|---|---|---|---|---|---|
| Comparative Example | A | B | C | D | E | F | G | H |
| Ricon 131MA | 22.2 | 21.0 | 22.2 | 22.2 | 22.2 | 23.66 | 20.44 | 24.36 |
| Poly bd R45HT | 14.8 | 14.0 | 14.8 | 14.8 | 14.8 | 15.94 | 14.56 | 15.64 |
| ADMA-14 | 1.3 | 1.4 | 1.26 | 1.26 | 1.26 | 0.99 | — | — |
| Fuelsaver | 0.2 | 0.2 | 0.2 | 0.2 | 0.2 | — | 0.3 | 0.34 |
| Flexon 650 | 25.6 | 25.5 | 20.6 | 20.6 | 19.9 | 25.74 | — | 27.66 |
| Soybean Oil | 34.7 | 35.9 | 39.94 | 39.94 | 38 | 32.68 | — | 32.0 |
| Vikoflex 9080 | 1.2 | 2.0 | — | — | — | 0.99 | — | — |
| Vikolox 12 | — | — | 1.0 | — | — | — | 36.0 | — |
| Vikoflex 7190 | — | — | — | 1.0 | 0.5 | — | 28.7 | — |
| A/E Ratio | 2.4 | 1.4 | 2.6 | 2.3 | 4.5 | 2.9 | — | — |

TABLE III-continued

| Comparative Example | COMPARATIVE EXAMPLES A | B | C | D | E | F | G | H |
|---|---|---|---|---|---|---|---|---|
| Tear Strength N/cm | 8.1 | 8.1 | 10.0 | 7.9 | 7.7 | 9.3 | 4.6 | 6.6 |
| Tensile Strength N/cm$^2$ | 15.4 | 15.0 | 15.0 | 12.4 | 13.8 | 14.8 | 9.2 | 13.4 |
| Elongation % | 112 | 117 | 117 | 153 | 144 | 146 | 103 | 110 |
| Geltime (minutes) | 53.4 | 54.7 | 52.1 | 70.0 | 62.0 | 68.1 | — | — |
| Gel-Clarity | T | T | T | T | T | T | T | T |
| Hydrolytic Stability (7 days, 100° C., water pH 11.5) Hardness (quarter cone) Change in quarter cone % Weight Change | very soft did not hold shape | very soft did not hold shape | disin- tegrated | disin- tegrated | disin- tegrated | very soft did not hold shape | disin- tegrated | disin- tegrated |

TABLE IV

| Comparative Example | COMPARATIVE EXAMPLES I Control | J Heated Control | K D1000 | L 126 |
|---|---|---|---|---|
| Polycarbonate Compatibility 50° C. (breaking force, newtons) | 538.4 | | | |
| 1 week | | 570 | 507 | 498 |
| 3 weeks | | 574 | 476 | 449 |
| 4 weeks | | 552 | 405 | 369 |
| PCV Value | | | 75 | 69 |

The data presented in Tables II–IV indicates that encapsulant compositions according to the invention are hydrolytically stable. The data further confirms that adhesion to conductors and polycarbonate compatability are not adversely affected by use of oxirane materials in encapsulants of the invention. Without the oxirane material present, the resulting gel disintegrates as shown by comparative examples G and H in the hydrolytic stability test. Comparative examples A through F provide evidence that an inadequate amount of oxirane material leads to poor hydrolytic stability with very soft materials or disintegration resulting from this test. An important characteristic of encapsulants are their insulating properties which help prevent line losses or other transmission efficiencies in electrical cables or devices.

TABLE V

| Example | Dielectric Constant at 1 MHz |
|---|---|
| 1 | 2.93 |
| 3 | 2.88 |
| 19 | 2.91 |
| 26 | 2.83 |

In Table V the dielectric constants of Examples 1, 3, 19 and 26 are present. The table indicates that encapsulants according to the invention exhibit excellent electrical properties as a result of low dielectric constants of about or less than 3 at 1 MHz (as determined by ASTM D-150).

What is claimed is:

1. A grease compatible, hydrolytically stable dielectric encapsulant capable of being used to encapsulate a splice of a signal conducting device comprising:

an extended reaction product of an admixture of (a) an effective amount of an anhydride functionalized compound having reactive anhydride sites;

(b) an effective amount of a crosslinking agent that reacts with the anhydride sites of said compound to form a cured cross-linked material; and (c) an effective amount of an oxirane containing material to provide hydrolytic stability;

wherein said reaction product is extended with at least one plasticizer present in the range of between 5 and 95 percent by weight of the encapsulant and said at least one plasticizer is essentially inert with said reaction product and is substantially non-exuding therefrom; and said encapsulant having a C-H adhesion value of at least 4.

2. The encapsulant of claim 1 wherein said oxirane containing material has at least one oxirane group.

3. The encapsulant of claim 2 wherein said admixture has a ratio of equivalents of anhydride functionalized compound to epoxy equivalent of between about 0.25 to about 1.5.

4. The encapsulant of claim 3 wherein said ratio is between about 0.25 to about 0.55.

5. The encapsulant of claim 2 wherein said oxirane containing material is selected from the group consisting of aliphatic alkyl, alkenyl, alkadiene, and cycloalkyl epoxies.

6. The encapsulant of claim 5 wherein said oxirane containing material is selected from the group consisting of aliphatic glycidyl ethers, aliphatic glycidyl esters, epoxidized dienes, epoxidized polyesters, epoxidized alpha olefins, epoxidized polyolefins, epoxidized natural rubber, epoxidized oils.

7. The encapsulant of claim 6 wherein said oxirane containing material is an epoxidized oil.

8. The encapsulant of claim 7 wherein said epoxidized oil is an epoxidized polyunsaturated vegetable oil.

9. The encapsulant of claim 2 wherein said oxirane containing material is selected from the group consisting of monoepoxy, diepoxy and polyepoxy compounds and combinations thereof.

10. The encapsulant of claim 1 wherein said oxirane containing material is present in an amount ranging between about 1.5 to about 50 percent by weight based on the total solids of said reaction product.

11. The encapsulant of claim 10 wherein said anhydride functionalized compound is present in an amount ranging between about 1 to about 90 percent by weight based on total solids of said reaction product and said crosslinking agent is present in an amount ranging between about 0.5 to about 80 percent by weight based on the total solids of said reaction product.

12. The encapsulant of claim 1 wherein said anhydride functionalized compound is present in an amount ranging from about 3 to 60 percent by weight, said crosslinking agent is present in an amount ranging from about 1 to 30 percent by weight and said oxirane containing material is present in an amount ranging from about 1.5 to about 20 percent by weight, each based on the total weight of the encapsulant.

13. The encapsulant of claim 11 further comprising a catalyst present in an amount between 0.1 and 5 percent by weight based on total solids of said reaction product.

14. The encapsulant of claim 1 wherein said encapsulant has a tensile strength of less than about 21.1N/$cm^2$ and between about 50 to 250 percent elongation.

15. The encapsulant of claim 1 having a total solubility parameter of between about 7.9 to about 9.5.

16. The encapsulant of claim 1 having a Polycarbonate Compatibility Value of at least 80.

17. A hydrolytically stable dielectric encapsulant capable of being used to encapsulate a signal transmission device comprising:

(1) an extended reaction product of an admixture of (a) an effective amount of an anhydride functionalized compound having reactive anhydride sites;

(b) an effective amount of a polyol cross-linking agent that reacts with the anhydride sites of said compound to form a cured crosslinked material;

(c) an effective amount of an oxirane material sufficient to provide hydrolytic stability;

(d) an effective amount of a catalyst for the reaction between said anhydride functionalized composition, said polyol crosslinking agent and said oxirane material capable of catalyzing the reaction thereof in less than about 24 hours at 25° C.; and (2) at least one plasticizer present in the range of between 5 and 95 percent by weight of said encapsulant and being essentially inert with said reaction product and substantially non-exuding therefrom, wherein said encapsulant has a C-H adhesion value of at least 4.

* * * * *

UNITED STATES PATENT AND TRADEMARK OFFICE
CERTIFICATE OF CORRECTION

PATENT NO. : 4,985,475

DATED : January 15, 1991

INVENTOR(S) : Thomas S. Croft and Hartwick A. Haugen

It is certified that error appears in the above-identified patent and that said Letters Patent is hereby corrected as shown below:

Col. 8, line 63, "$\delta_b$" should read -- $\phi_b$ --.

Col. 9, lines 45-46, "(3,5-di-tert-butyl-4-hydroxyhydrochinnamate)methane," should read --(3,5-di-tert-butyl-4-hydroxy-hydrocinnamate)methane,--.

Col. 14, line 20, "breaker" should read --beaker--.

Col. 14, line 27, "breaker" should read --beaker--.

Cols. 13 and 14, Table II, "4.2" under Example 10, in the line identified as Vikoflex 7190 should read --4.0--.

Cols. 15 and 16, Table II-continued, the second occurrence of "26.2" in the line identified as C-H Adhesion Value, N Flexgel, should be in the column identified as Example 24.

Cols. 15 and 16, Table II-continued, in the line identified as A/E Ratio, Example 34 should read --0.48--, Example 35 should read --0.68--, and Example 36 should read --0.52--.

Cols. 17 and 18, Table II-continued, in the line identified as DAMA-810, Example 40 should read --2.9--, Example 41 should read --2.9--, Example 42 should read --2.9--, Example 43 should read --2.9--, Example 44 should read --2.9--.

UNITED STATES PATENT AND TRADEMARK OFFICE
CERTIFICATE OF CORRECTION

PATENT NO. : 4,985,475

DATED : January 15, 1991

INVENTOR(S) : Thomas S. Croft and Hartwick A. Haugen

It is certified that error appears in the above-identified patent and that said Letters Patent is hereby corrected as shown below:

Cols. 17 and 18, Table II-continued, in the line identified as Witconol APM, Example 42 should read --19.86--, Example 43 should be blank.

Signed and Sealed this

Second Day of March, 1993

*Attest:*

STEPHEN G. KUNIN

*Attesting Officer*

*Acting Commissioner of Patents and Trademarks*